United States Patent
Faleide

[11] Patent Number: 6,012,545
[45] Date of Patent: Jan. 11, 2000

[54] FOLDABLE VEHICLE LADDER SYSTEM

[76] Inventor: Erling Faleide, 5341 29th St. NE., Maddock, N. Dak. 58348

[21] Appl. No.: 09/134,068

[22] Filed: Aug. 13, 1998

Related U.S. Application Data

[63] Continuation of application No. 09/007,448, Jan. 15, 1998, abandoned.

[51] Int. Cl.$^7$ ....................................................... A62B 5/00
[52] U.S. Cl. ............................................. 182/97; 182/127
[58] Field of Search .................................. 182/97, 95, 98, 182/91, 93, 84, 127

[56] References Cited

U.S. PATENT DOCUMENTS

| | | | |
|---|---|---|---|
| 375,701 | 12/1887 | Fallgatter | 182/97 |
| 3,601,220 | 8/1971 | Saucier . | |
| 3,869,022 | 3/1975 | Wallk | 182/98 |
| 4,021,071 | 5/1977 | Norman . | |
| 4,492,286 | 1/1985 | Lemire . | |
| 5,538,100 | 7/1996 | Hedley . | |

FOREIGN PATENT DOCUMENTS

| | | | |
|---|---|---|---|
| 32223 | 6/1962 | Finland | 182/98 |
| 1565792 | 5/1969 | France | 182/97 |
| 80971 | 5/1982 | Japan | 182/127 |
| 127788 | 3/1950 | Sweden | 182/97 |
| 728 787 | 4/1955 | United Kingdom | 182/97 |

*Primary Examiner*—Alvin Chin-Shue

[57] ABSTRACT

A foldable vehicle ladder system for allowing a user to easily view and access the interior portion of a truck box and other equipment. The inventive device includes a pair of base members attached in parallel to a side of a truck box, a pair of lower arms pivotally attached to the pair of base member, a pair of upper arms pivotally attached to the upper portion of the pair of base members, a pair of support members having a plurality of rungs attached between are pivotally attached to the distal ends of the lower arms and the upper arms, and a pair of latches attached to the pair of base members for securing the ladder portion in a vertical storage position. The ladder portion of the invention extends downwardly at an angle to assist supporting the vertical weight of the user when climbing. A pair of upper wedges and a pair of lower wedges limit the downward movement of the lower arms and upper arms. The upper arms are preferably shorter in length than the lower arms to allow the upper portion of the invention to be closer to the truck box when extended downward. The lowest rung is preferably lower than the lower edge of the truck box when the present invention is fully extended to allow easy access for the user.

7 Claims, 3 Drawing Sheets

FOLDABLE VEHICLE LADDER SYSTEM

CROSS-REFERENCE TO RELATED PATENT APPLICATION

This application is a continuation of Ser. No. 09/007,448, filed Jan. 15, 1998, abandoned.

I hereby claim benefit under Title 35, United States Code, Section 120 of United States patent application Ser. No. 09/007,448 filed Jan. 15, 1998. The Ser. No. 09/007,448 application is abandoned.

BACKGROUND OF THE INVENTION

1. Field of the Invention

The present invention relates generally to ladder devices and more specifically it relates to a foldable vehicle ladder system for allowing a user to easily view and access the interior portion of a truck box, trailer, or other equipment. The invention may also be utilized for stationary equipment or structures such as buildings or augers.

2. Description of the Prior Art

Ladder devices for vehicles have been in use for years. Typically, a stationary ladder is permanently attached to the side of the truck box. The stationary ladder has a series of rungs that allow the user to climb upon.

Conventional ladder devices for vehicles do not allow the user to easily reach the lowest rung since the height of the lower rung is dictated by the lower edge of the truck box which can be relatively high. Another problem with the prior art is that the rungs are extremely close to the truck box making it difficult for the user to properly position their foot upon the rung. Also, because the rungs are extremely close to the truck box, the user's hands and other articles are subject to becoming "trapped" between the rungs and the truck box making the conventional ladder systems extremely hazardous. Finally, since conventional ladder systems are "parallel" to the truck box which is usually orthogonal to the ground surface, the user has to complete support their vertical weight.

Examples of ladder devices for vehicles include U.S. Pat. No. 3,601,220 to Saucier and U.S. Pat. No. 4,492,286 which are all illustrative of such prior art. While these devices may be suitable for the particular purpose to which they address, they are not as suitable for allowing a user to easily view and access the interior portion of a truck box and other equipment. These ladder devices for vehicles do not allow the user to easily reach the lowest rung since the height of the lower rung is dictated by the lower edge of the truck box which can be relatively high. Another problem with the prior art is that the rungs are extremely close to the truck box making it difficult for the user to properly position their foot upon the rung. Also, because the rungs are extremely close to the truck box, the user's hands and other articles are subject to becoming "trapped" between the rungs and the truck box making the conventional ladder systems extremely hazardous. Finally, since conventional ladder systems are "parallel" to the truck box which is usually orthogonal to the ground surface, the user has to complete support their vertical weight.

In these respects, the foldable vehicle ladder system according to the present invention substantially departs from the conventional concepts and designs of the prior art, and in so doing provides an apparatus primarily developed for the purpose of allowing a user to easily view and access the interior portion of a truck box and other equipment.

SUMMARY OF THE INVENTION

A primary object of the present invention is to provide a foldable vehicle ladder system that will overcome the shortcomings of the prior art devices.

Another object is to provide a foldable vehicle ladder system that is foldable adjacent a surface of the truck box for convenient storage.

An additional object is to provide a foldable vehicle ladder system that may be positioned downwardly to allow easy access for the user.

A further object is to provide a foldable vehicle ladder system that is slanted upwardly toward the truck box when extended to help support the user's weight when climbing the ladder.

Another object is to provide a foldable vehicle ladder system that positions the rungs away from the truck box surface.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

The foldable vehicle ladder system allows a user to easily view and access the interior portion of a truck box and other equipment. The inventive device includes a pair of base members attached in parallel to a side of a truck box, a pair of lower arms pivotally attached to the pair of base member, a pair of upper arms pivotally attached to the upper portion of the pair of base members, a pair of support members having a plurality of rungs attached between are pivotally attached to the distal ends of the lower arms and the upper arms, and a pair of latches attached to the pair of base members for securing the ladder portion in a vertical storage position. The ladder portion of the invention extends downwardly at an angle to assist supporting the vertical weight of the user when climbing. A pair of upper wedges and a pair of lower wedges limit the downward movement of the lower arms and upper arms. The upper arms are preferably shorter in length than the lower arms to allow the upper portion of the invention to be closer to the truck box when extended downward. The lowest rung is preferably lower than the lower edge of the truck box when the present invention is fully extended to allow easy access for the user.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
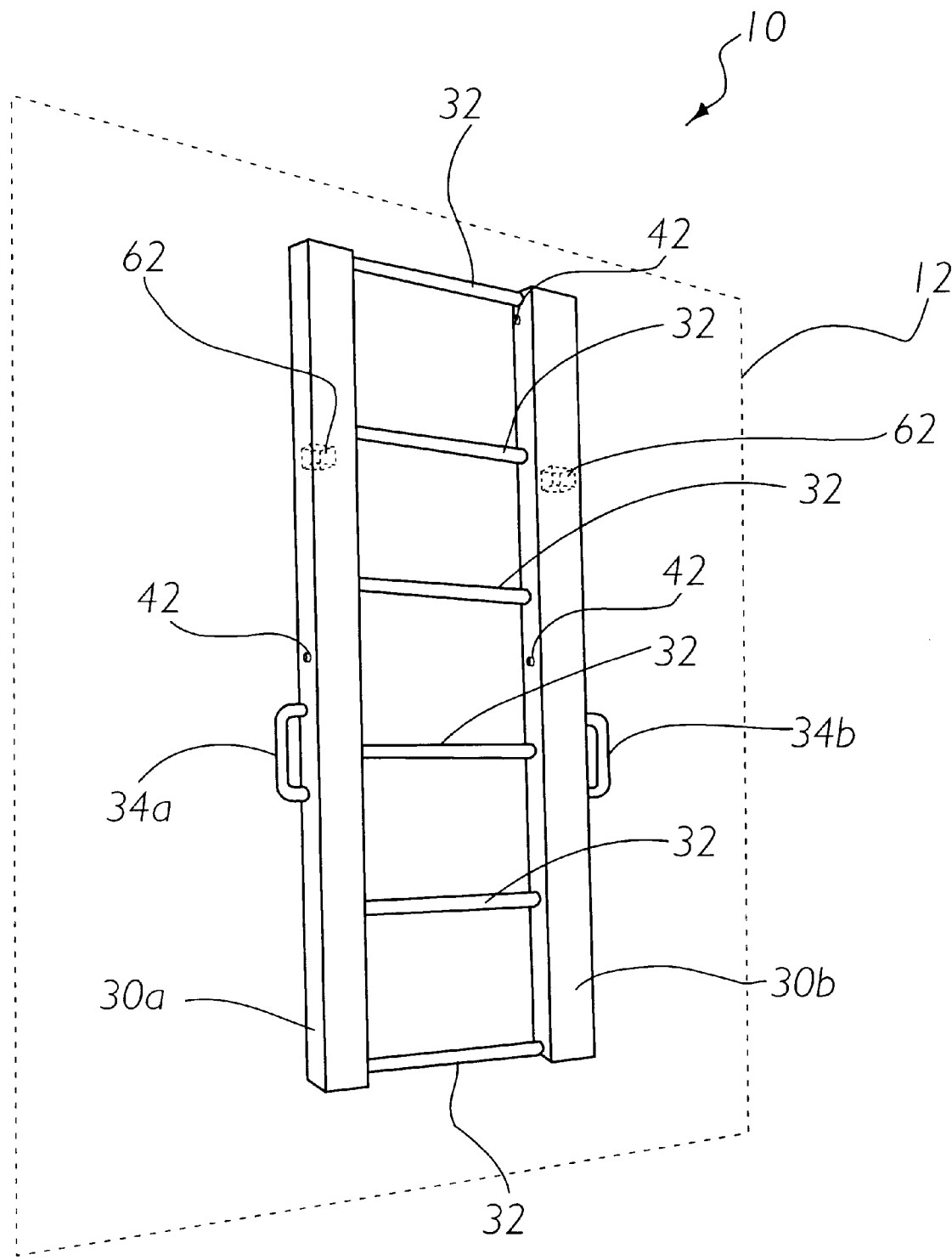
FIG. 1 is a perspective view of the present invention attached to a side of a truck box in the storage position.
Figure 2:
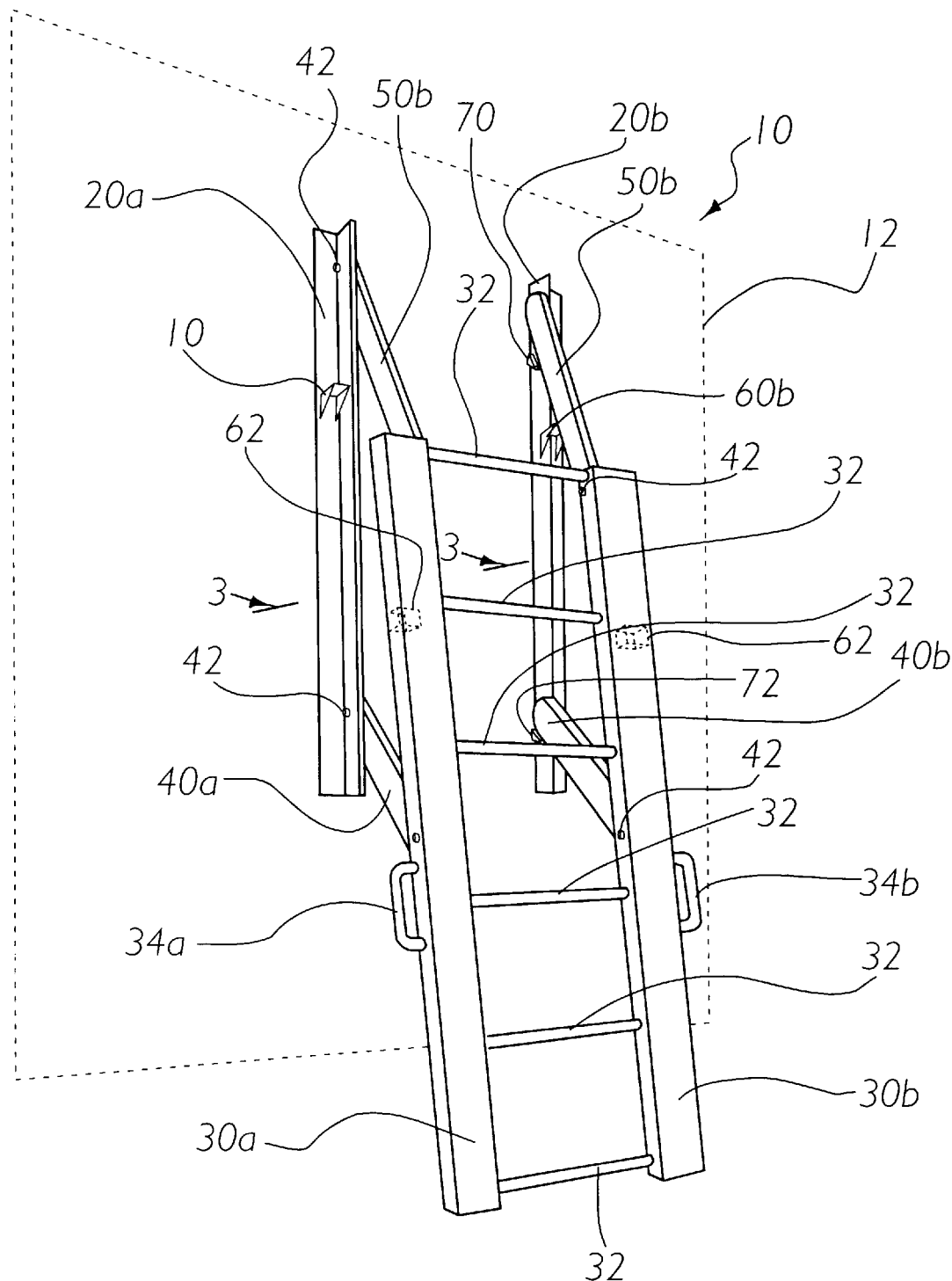
FIG. 2 is a perspective view of the present invention attached to a side of a truck box in the extended position.
Figure 3:
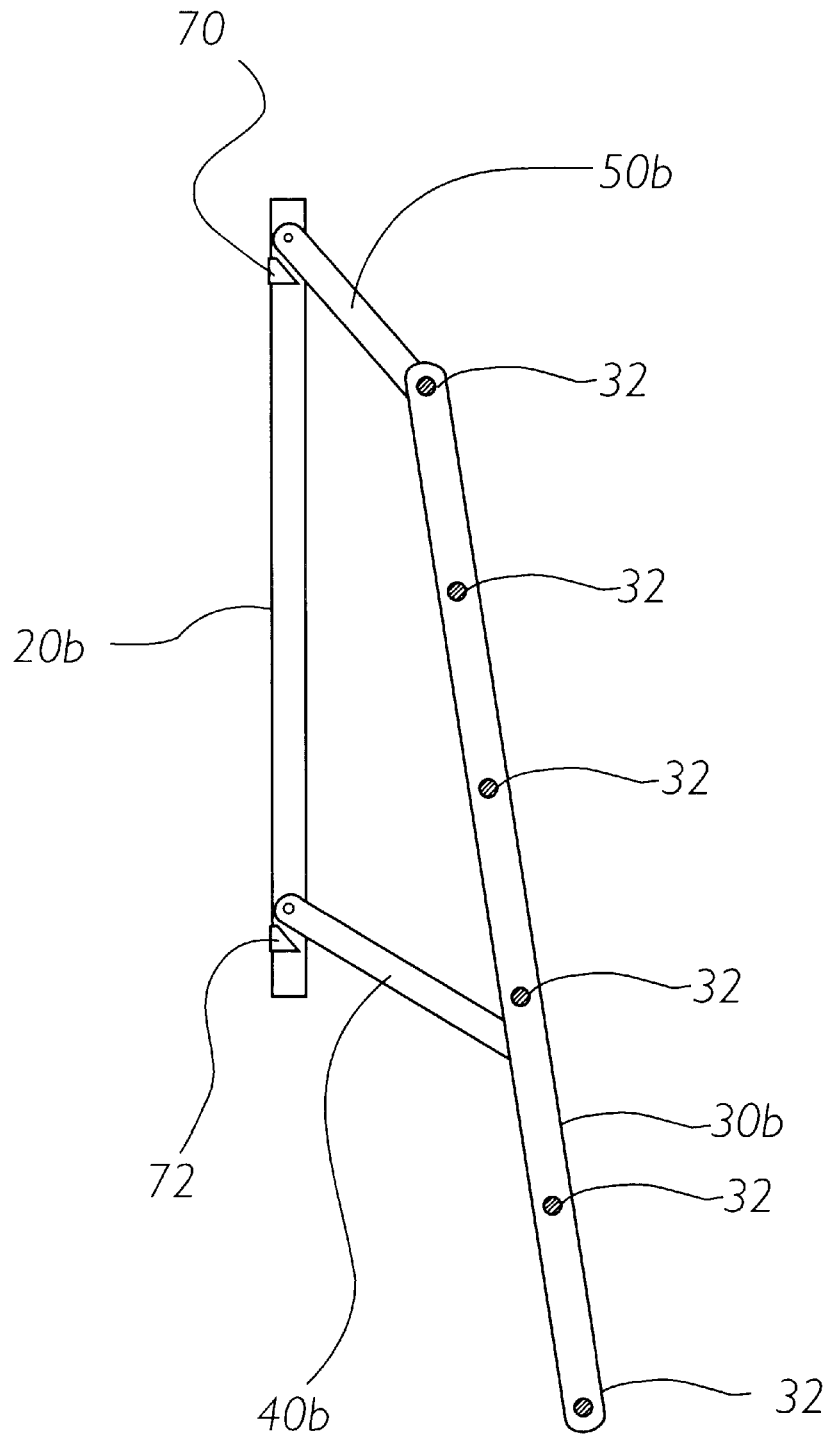
FIG. 3 is a cross-sectional view taken along line 3—3 of FIG. 2 of the drawings.

Turning now descriptively to the drawings, in which similar reference characters denote similar elements throughout the several view, FIGS. 1 through 3 illustrate a foldable vehicle ladder system 10, which comprises a pair of base members 20a–b attached in parallel to a side of a truck box 12, a pair of lower arms 40a–b pivotally attached to the pair of base member, a pair of upper arms 50 pivotally attached to the upper portion of the pair of base members 20*a–b*, a pair of support members 30 having a plurality of rungs 32 attached between are pivotally attached to the distal ends of the lower arms 40*a–b* and the upper arms 50, and a pair of latches 60 attached to the pair of base members 20*a–b* for securing the ladder portion in a vertical storage position. The ladder portion of the invention extends downwardly at an angle to assist supporting the vertical weight of the user when climbing. A pair of upper wedges 70 and a pair of lower wedges 72 limit the downward movement of the lower arms 40*a–b* and upper arms 50. The upper arms 50 are preferably shorter in length than the lower arms 40*a–b* to allow the upper portion of the invention to be closer to the truck box 12 when extended downward. The lowest rung 32 is preferably lower than the lower edge of the truck box 12 when the present invention is fully extended to allow easy access for the user.

As best shown in FIG. 2 of the drawings, a pair of opposing base members 20*a–b* are attached to the side of the truck box 12. The opposing base members 20*a–b* are preferably parallel to one another but may be of various configurations. The base members 20*a–b* may be constructed of conventional materials such as metal, plastic or fiberglass as can be appreciated by one skilled in the art. The base members 20*a–b* are preferably constructed having a L-shaped cross-section as shown in FIG. 2 commonly referred to as "angle iron." However, one skilled in the art may appreciate that various other shapes of cross-sections may be utilized for the base members 20*a–b*. The base members 20*a–b* are attached to the truck box 12 by conventional fasteners 42, directly molded into the truck box 12 or welded to the truck box 12 as can be appreciated. Each of the base members 20*a–b* are of an elongated shape and are formed to the shape of the truck box 12 as shown in FIG. 2 of the drawings.

As shown in FIGS. 1 and 2 of the drawings, a pair of opposing support members 30 are attached to each other by a plurality of rungs 32 forming a ladder. The ladder may be constructed of conventional materials such as metal or plastic. The opposing support members 30 may be longer or shorter than the corresponding base members 20*a–b*. The opposing support members 30 may have a cross-section of various shapes, but preferably have a U-shaped cross-section to encase the base members 20*a–b* when in the storage position. One or more handles 34 may be attached to the support members 30 or rungs 32 as shown in FIGS. 1 and 2 of the drawings to allow the user to pull down the ladder from the storage position.

The ladder is pivotally supported to the pair of opposing base members 20*a–b* by a pair of opposing lower arms 40*a–b* and a pair of opposing upper arms 50 as shown by FIG. 2 of the drawings. The pair of lower arms 40*a–b* are pivotally attached at one end to the lower portion of the base members 20*a–b* by a pair of fasteners 42. The distal ends of the pair of lower arms 40*a–b* are pivotally attached to the mid-section to lower section of the corresponding pair support members 30 as shown in FIG. 2 of the drawings. As shown in FIG. 2 of the drawings, the upper arms 50 are pivotally attached to an upper portion of the base members 20*a–b* by a pair of fasteners 42. The distal ends of the upper arms 50 are pivotally attached to the upper section of the corresponding pair of support members 30.

As shown in FIG. 3 of the drawings, the lower arms 40*a–b* are preferably longer than the upper arms 50 to provide an angle for the ladder when fully extended. As further shown in FIG. 3 of the drawings, a pair of upper wedges 70 are attached to the base members 20*a–b* respectively. The pair of upper wedges 70 limit the downward pivoting of the upper arms 50 at a desired location. As shown in FIG. 3 of the drawings, a pair of lower wedges 72 are attached to the base members 20*a–b* respectively. The pair of lower wedges 72 limit the downward pivoting of the lower arms 40*a–b* at a desired location. Preferably, as shown in FIG. 3 of the drawings, the angle of the upper arms 50 with respect to a vertical axis is steeper than the angle of the lower arms 40*a–b* when both the lower arms 40*a–b* and the upper arms 50 are in engagement with the lower wedges 72 and the upper wedges 70 respectively. This allows the ladder to be positioned at a comfortable climbing angle that helps support the user's vertical weight when climbing while ensuring the upper portion of the ladder is near the truck box 12.

As shown in FIG. 2 of the drawings, a pair of latches 60 are attached to the corresponding pair of base members 20*a–b*. The pair of latches 60 removably catch a pair of corresponding catch members 62 attached to the support members 30 when the ladder is positioned substantially parallel to the pair of base members 20*a–b*, thereby retaining the ladder in a substantially parallel storage position with respect to the truck box 12 to prevent engagement with objects near the truck box 12.

In use, the user grasps the handles 34 to pull the ladder downwardly. With sufficient force, the latches 60 release the catch members 62 thereby allowing the ladder to descend downwardly and outwardly with respect to the truck box 12. The user continues to pull the ladder down until the lower arms 40*a–b* and the upper arms 50 are stopped by the lower wedges 72 and the upper wedges 70 respectively as shown in FIGS. 2 and 3 of the drawings. The user then steps upon the lowest rung 32 and ascends up the ladder with a portion of their weight being supported because of the angle the ladder is positioned with respect to a vertical axis. After viewing the contents of the truck box 12, the user descends downwardly from the ladder. The user then grasps the handles 34 and elevates the ladder until the catch members 62 are engaged with the latches 60 to secure the ladder to the side of the truck box 12. The user then operates the truck or other vehicle as normal without worrying about the invention engaging an object near the truck box 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A foldable vehicle ladder system for providing easy access to an elevated structure, comprising:

a base attachable to a side of said elevated structure;

a pair of lower arms pivotally attached to a lower portion of said base;

a pair of upper arms pivotally attached to an upper portion of said base;

a ladder means pivotally attached to the distal ends of said pair of lower arms and said pair of upper arms;

a latch means attached to said base for selectively retaining said ladder means in a storage position;

a pair of upper wedges secured to said base adjacent said upper arms for limiting the rotational movement of said upper arms; and a pair of lower wedges secured to said base adjacent said lower arms for limiting the rotational movement of said lower arms.

2. The foldable vehicle ladder system of claim 1, wherein said lower arms are more horizontal than said upper arms when said ladder means is in said extended position.

3. The foldable vehicle ladder system of claim 2, wherein said lower arms are longer than said upper arms.

4. The foldable vehicle ladder system of claim 3, wherein said ladder means comprises:

a pair of opposing support members; and a plurality of rungs secured between said pair of opposing support members.

5. The foldable vehicle ladder system of claim 4, wherein said base comprises a pair of opposing base members.

6. The foldable vehicle ladder system of claim 5, wherein said latch means comprises:

a pair of latches attached to said pair of opposing base members; and a pair of catch members attached to said pair of opposing support members for catchably engaging said pair of latches.

7. The foldable vehicle ladder system of claim 6, wherein said ladder means further includes at least one handle.

* * * * *